(12) United States Patent
Badhorn et al.

(10) Patent No.: US 10,473,243 B2
(45) Date of Patent: Nov. 12, 2019

(54) HOSE REPAIR KIT WITH LIVE SWIVEL COUPLING

(71) Applicant: Tectran Mfg. Inc., Cheektowaga, NY (US)

(72) Inventors: Edward H. Badhorn, Clarence Center, NY (US); Kenneth M. Caprio, Cheektowaga, NY (US)

( * ) Notice: Subject to any disclaimer, the term of this patent is extended or adjusted under 35 U.S.C. 154(b) by 152 days.

(21) Appl. No.: 15/871,576

(22) Filed: Jan. 15, 2018

(65) Prior Publication Data
US 2018/0135787 A1     May 17, 2018

Related U.S. Application Data

(63) Continuation-in-part of application No. 15/416,728, filed on Jan. 26, 2017, now Pat. No. 9,869,416.

(Continued)

(51) Int. Cl.
| | |
|---|---|
| F16L 33/24 | (2006.01) |
| F16L 27/08 | (2006.01) |
| B60T 17/04 | (2006.01) |
| F16L 3/10 | (2006.01) |
| F16L 57/00 | (2006.01) |
| F16L 33/30 | (2006.01) |
| F16L 37/088 | (2006.01) |
| F16L 3/223 | (2006.01) |

(52) U.S. Cl.
CPC .............. *F16L 27/08* (2013.01); *B60T 17/04* (2013.01); *B60T 17/043* (2013.01); *F16L 3/1075* (2013.01); *F16L 3/2235* (2013.01); *F16L 27/0812* (2013.01); *F16L 33/24* (2013.01); *F16L 33/30* (2013.01); *F16L 37/088* (2013.01); *F16L 57/005* (2013.01)

(58) Field of Classification Search
CPC ....... F16L 33/22; F16L 33/226; F16L 33/225; F16L 33/24; F16L 33/20; F16L 33/207; F16L 33/2071; F16L 33/2073; F16L 33/2078; F16L 27/08; F16L 27/0816; F16L 27/0812
USPC ....... 285/276, 414, 280, 278, 307, 353, 321, 285/251, 245, 242
See application file for complete search history.

(56) References Cited

U.S. PATENT DOCUMENTS 3,367,681 A * 2/1968 Braukman .......... F16L 27/0816
                                                           285/94
3,726,547 A * 4/1973 Cox, Jr. .................. F16L 47/24
                                                         285/149.1

(Continued)

*Primary Examiner* — Aaron M Dunwoody
(74) *Attorney, Agent, or Firm* — John W. Powell; Verrill

(57) ABSTRACT

A hose repair kit includes a retaining sleeve having a first opening to receive an end of a hose. There is a swivel coupling inserted into a second end of the hose retaining sleeve to engage with the hose. The swivel coupling includes a first annular member with an annular barb at one end and a socket to receive a key at a second end. There is an annular retaining ring groove with a retaining ring therein. A second annular member receives, within an internal bore having an annular recess, the first annular member and the retaining ring engages the annular recess to secure the first annular member to the second annular member. The surface of the bore is frusto-conically shaped allowing the retaining ring to be compressed as it travels into the bore until it reaches the annular recess and expands into and is seated in the annular recess.

8 Claims, 7 Drawing Sheets

Related U.S. Application Data

(60) Provisional application No. 62/287,420, filed on Jan. 26, 2016.

(56) References Cited

U.S. PATENT DOCUMENTS

| | | | | |
|---|---|---|---|---|
| 3,773,360 A * | 11/1973 | Timbers | F16L 37/088 | 285/307 |
| 3,900,221 A * | 8/1975 | Fouts | F16L 27/0812 | 285/276 |
| 3,948,548 A * | 4/1976 | Voss | F16L 37/088 | 285/321 |
| 4,278,276 A * | 7/1981 | Ekman | F16L 37/088 | 285/321 |
| 4,412,693 A * | 11/1983 | Campanini | F16L 27/0816 | 285/148.13 |
| 4,448,447 A * | 5/1984 | Funk | B60T 17/04 | 285/136.1 |
| 4,592,388 A * | 6/1986 | Wilcox | F16L 37/008 | 137/615 |
| 4,707,000 A * | 11/1987 | Torgardh | F16L 37/088 | 285/305 |
| 4,736,969 A * | 4/1988 | Fouts | F16L 33/223 | 285/245 |
| 4,863,202 A * | 9/1989 | Oldford | F16L 19/0231 | 285/321 |
| 5,226,682 A * | 7/1993 | Marrison | F16L 37/088 | 285/308 |
| 5,340,168 A * | 8/1994 | Barker | F16L 27/0812 | 285/147.1 |
| 5,419,594 A * | 5/1995 | Nelms | F16L 37/088 | 285/315 |
| 5,681,060 A * | 10/1997 | Berg | F16L 37/088 | 285/305 |
| 6,053,537 A * | 4/2000 | Guest | F16L 41/088 | 285/148.19 |
| 6,095,570 A * | 8/2000 | Hagen | F16L 37/084 | 285/321 |
| 6,158,783 A * | 12/2000 | Johnson | F16L 37/008 | 285/139.1 |
| 6,491,325 B1 * | 12/2002 | Boche | F16L 27/0816 | 285/256 |
| 6,554,322 B2 * | 4/2003 | Duong | F24H 9/2035 | 285/201 |
| 6,817,391 B2 * | 11/2004 | Riviezzo | F16L 27/093 | 141/368 |
| 6,869,108 B2 * | 3/2005 | Kwon | F16L 37/088 | 285/276 |
| 7,267,374 B2 * | 9/2007 | Nielson | F16L 27/0808 | 285/353 |
| 7,338,094 B2 * | 3/2008 | Hoffmann | F16L 37/088 | 285/276 |
| 7,963,570 B2 * | 6/2011 | Swift | F16L 37/088 | 285/321 |
| 8,474,879 B2 * | 7/2013 | Herrera | F16L 37/088 | 285/321 |
| 8,827,319 B2 * | 9/2014 | Chung | F16L 27/0816 | 285/272 |
| 8,888,138 B2 * | 11/2014 | Lefere | F16L 33/2073 | 285/109 |
| 9,022,431 B2 * | 5/2015 | Furst | F16L 19/0653 | 285/251 |
| 2003/0025096 A1 * | 2/2003 | Jeory | F16L 29/02 | 251/149 |
| 2003/0067164 A1 * | 4/2003 | Hoffman | F16L 27/093 | 285/322 |
| 2004/0046386 A1 * | 3/2004 | Chien | F16L 37/148 | 285/276 |
| 2006/0208483 A1 * | 9/2006 | Guo | F16L 35/005 | 285/276 |
| 2013/0154257 A1 * | 6/2013 | Ault | F16L 19/075 | 285/251 |
| 2014/0318664 A1 * | 10/2014 | Mayher | F16L 27/0861 | 138/155 |
| 2016/0102794 A1 * | 4/2016 | Chung | F16L 27/0849 | 285/179 |
| 2018/0135787 A1 * | 5/2018 | Badhorn | F16L 27/0812 | |

* cited by examiner

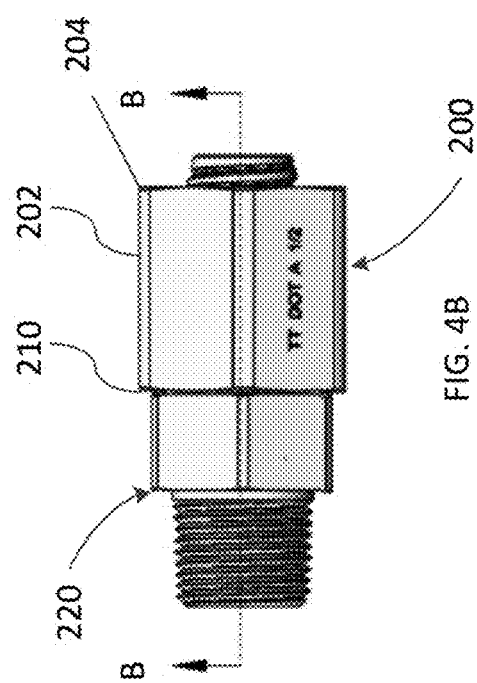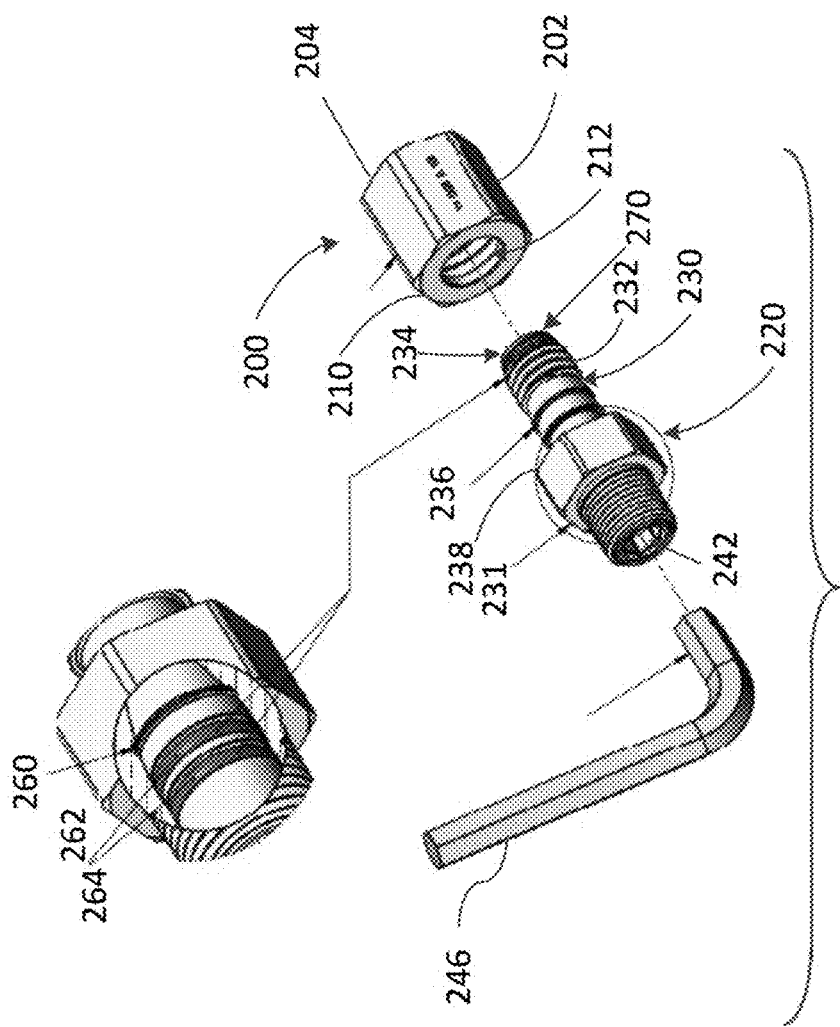

HOSE REPAIR KIT WITH LIVE SWIVEL COUPLING

CROSS REFERENCE TO RELATED APPLICATIONS

This application is a continuation-in-part of U.S. patent application Ser. No. 15/416,728 filed Jan. 26, 2017, entitled SWIVEL COUPLING AND HOSE ASSEMBLIES AND KITS UTILIZING THE SAME, which claims benefit of priority of U.S. Provisional Patent Application Ser. No. 62/287,420 filed Jan. 26, 2016, entitled FLEXIBLE TAPERED GRIPS GRIP FITTINGS AND LIVE SWIVEL FITTING ASSEMBLIES, both of which are incorporated herein by reference.

FIELD OF THE INVENTION

The invention described herein relates generally to the field of swivel coupling assemblies and to swivel coupling assemblies which are easy to install and highly reliable even when used with hose lines operating in harsh industrial and commercial environments. More specifically, the present invention provides improved operation, durability, dependability, weather-resistance, usability, and reliability in hose end repair kits for air and hydraulic hoses in tractor-trailer and other industrial and commercial applications.

BACKGROUND OF THE INVENTION

Applications of swivel couplings for air tube and hose line connections in industrial and commercial environments require resistance to harsh environmental conditions and reliability under stress during installation and operation. For example, in applications in the freight hauling trucking and transportation industry, tractor-trailer air brake fittings and hose including swivel couplings for tube assemblies undergo continuous exposure to the elements, often in frigid conditions. Winter road salts and brine, dirt, grease, and other solvents erode fittings and assemblies of critical air brake tube and hose connections, putting the safety of the driver and highway motorists at risk.

Tube and hose lines, as well as grips and couplings for such tube and hose lines used within harsh industrial and commercial environments generally must withstand such harsh environments as well as perform reliably under the stress and strain forces encountered during installation and operation. Such tube and hose lines may involve high pressure hydraulics or air and often require some flexibility of the tube or hose.

Hoses and tubes are commonly used in applications within the freight hauling industry, for example, to supply pressurized air for air brake operation between a tractor cab unit and a freight trailer, or from a locomotive to railway air brakes on railroad cars. Inherent to the freight industry is the constant coupling and decoupling of hoses/tubes as trailers are left for loading or unloading and other trailers are picked up for delivery. Various types of components including swivel couplings, are used to interconnect hose/tube sections to other hoses/tubes sections and to terminals.

In such harsh operating environments, hose assemblies are susceptible to breaking and must be capable of being quickly and properly repaired in order to ensure safe operation of the vehicle while minimizing out of service time. Some hose repair kits utilize live swivel couplings which may be interconnected to a failed hose end. Typical hose end repair kits require multiple wrenches to be used to affix the swivel coupling to the hose end which makes repair more complicated and time consuming. Also, certain kits require crimping of the components of the live swivel together to interconnect the components. This requires the use of materials such as steel rather than the more malleable brass to prevent over-torquing and leakage. This leads to corrosion issues and fitting seize-up. It also makes field installation more difficult and less precise given the variability in the amount of crimping pressures likely to be applied by various users making repairs.

SUMMARY OF INVENTION

It is therefore an object of the invention to provide hose end repair kit having swivel couplings which are quick and easy to install in a repeatable and consistent manner.

It is another object of the invention to provide a hose end repair kit having swivel couplings which are more durable and less prone to over-torqueing and leakage as compared to live swivel fittings.

It is yet a further object of the invention to provide swivel couplings and swivel coupling assemblies with longer-life, redundant air seals, and a stronger friction hold at the barrel end of the fitting.

In a first aspect of this invention there is included a hose end repair kit including a hose retaining sleeve having a first end with a first opening in communication with an interior portion of the hose retaining sleeve. The first opening is configured to receive an end of a first hose into the interior of the hose retaining sleeve when the hose retaining sleeve is mounted on the first hose. The hose retaining sleeve further having a second end, opposite the first end, the second end having a second opening. There is a swivel coupling partially inserted into the second opening of the hose retaining sleeve and the swivel coupling is configured to engage with an interior of the first hose when the hose retaining sleeve is mounted on the first hose. The swivel coupling includes a first annular member having an outer surface and an inner surface. The first annular member includes a first end portion having at least one annular barb on the outer surface and configured to be inserted into the interior of the first hose. There is a second end portion spaced from the first end portion which has an opening allowing access to the inner surface of the first annular member wherein there is formed a socket to receive a key. There is an angled shoulder positioned between the at least one annular barb and the second end portion. There is at least one annular groove disposed in the outer surface of the first annular member and positioned between the shoulder and the second end portion. The at least one annular groove contains a seal and there is an annular retaining ring groove disposed in the surface of the first annular member and positioned between the at least one annular groove and the shoulder. The annular retaining ring groove contains a retaining ring which protrudes above the surface of the first annular member. There is second annular member having an outer surface and an inner surface, wherein the inner surface defines a bore configured to receive the first annular member. The second annular member includes a first end portion having a first opening in communication with the bore. There is second end portion spaced from the first end portion which has a second opening in communication with the bore. There is an annular recess in the inner surface of the bore which is configured to receive the retaining ring when the first annular member is inserted into the second annular member. The annular recess is aligned with the annular retaining ring groove. From a location proximate the first opening in the first end portion of the second annular member to a cylindrical portion of the bore, the inner surface of the bore is frusto-conically shaped. When the first annular member is inserted into the bore of the second annular member, the retaining ring is gradually compressed as the retaining ring travels along the frusto-conically shaped inner surface of the bore until it reaches the annular recess and expands into and is seated in the annular recess. And, the angled shoulder of the first annular member conforms with and frictionally engages the frusto-conically shaped inner surface of the bore of the second annular member proximate the first opening, thereby allowing the first annular member to rotate relative to the second annular member.

In one or more embodiments the following features may be included. The at least one annular groove of the swivel coupling may include a plurality of annular grooves and there may be a like plurality of seals, one disposed in each of the plurality of annular grooves. There may further be included a first bearing surface on a first side of the at least one annular groove in the direction of the shoulder and a second bearing surface on a second side of the at least one annular groove in the direction of the second end portion of the first annular member. The first bearing surface and the second bearing surface may have widths between one (1) and three and one half (3.5) times the width of the at least one annular groove. The frusto-conically shaped inner surface may be angled at least five degrees with respect to a longitudinal axis of the second annular member. The first end portion of the first annular member may include a plurality of annular barbs which are configured to engage with the interior of the first hose. The inner surface of the first annular member may define a bore configured to carry a fluid there-through. The outer surface of the second annular member proximate the second end portion may include a threaded portion configured to be engaged with a second hose or a complimentarily threaded fixture. The outer surface of the first annular member proximate the first end portion may include a threaded portion and the first annular member may be configured to be rotated when the key is inserted into the socket and a torque is applied thereto thereby causing the threaded portion of the first annular member to engage with the interior of the first hose.

The above and other benefits and advantages of the present invention will be readily apparent from the Detailed Description to follow.

BRIEF DESCRIPTION OF THE DRAWINGS

Embodiments of the present invention will now be described, by way of example only, with reference to the attached Figures, wherein:

FIG. 4A is an exploded perspective view of the hose end repair kit using a live swivel coupling according to this invention FIG. 4B is a side elevational view of the hose end repair kit of FIG. 4A;

DETAILED DESCRIPTION

The present invention will now be described more fully herein with reference to exemplary embodiments, examples of which are illustrated in the accompanying drawings. Embodiments and implementations set forth in the following detailed description do not represent all embodiments and implementations of the claimed invention. One skilled in the art will appreciate that the present teachings can be practiced with embodiments other than those summarized or disclosed below by the Figures and Detailed Description of the Invention to follow.

For purposes of the following discussion, the terms "hose" and "tube" may be used throughout interchangeably and should not be considered as limiting the invention. Use of either term is meant to encompass both hoses and tubes and all applicable types of such hoses and tubes. Hoses are generally reinforced in some way, normally with imbedded braid reinforcement, wire reinforcement, reinforcement with a stiff plastic, dual walls, or a single heavy wall. Hoses are often used and rated for applications that involve high pressure. Tubing, on the other hand, is not reinforced, or is sparsely reinforced, and is often used for gravity flow or lower pressure applications.

Likewise, the exemplary embodiments may describe particular connectors, flexible tapered grips and couplers/connectors, including swivel couplings, however, it should be understood that these are examples of implementations of the present invention. Indeed, the present invention may be implemented within a variety of connectors, flexible tapered grips and couplers/connectors including swivel couplings.

Further, the invention is described herein with regard to transportation applications, in particular trucking; however, there may be other equally suitable applications of the present invention outside of the context of trucking and such applications are well within the intended scope of the present disclosure. In particular, the present invention may be applicable to any suitable mobile or fixed implementations including, but not limited to, air or gas, hydraulic connections, fuel or other fluid transfer, land or marine connections, airplane terminal vestibules, and/or ship-to-shore connections.

Figure 1:
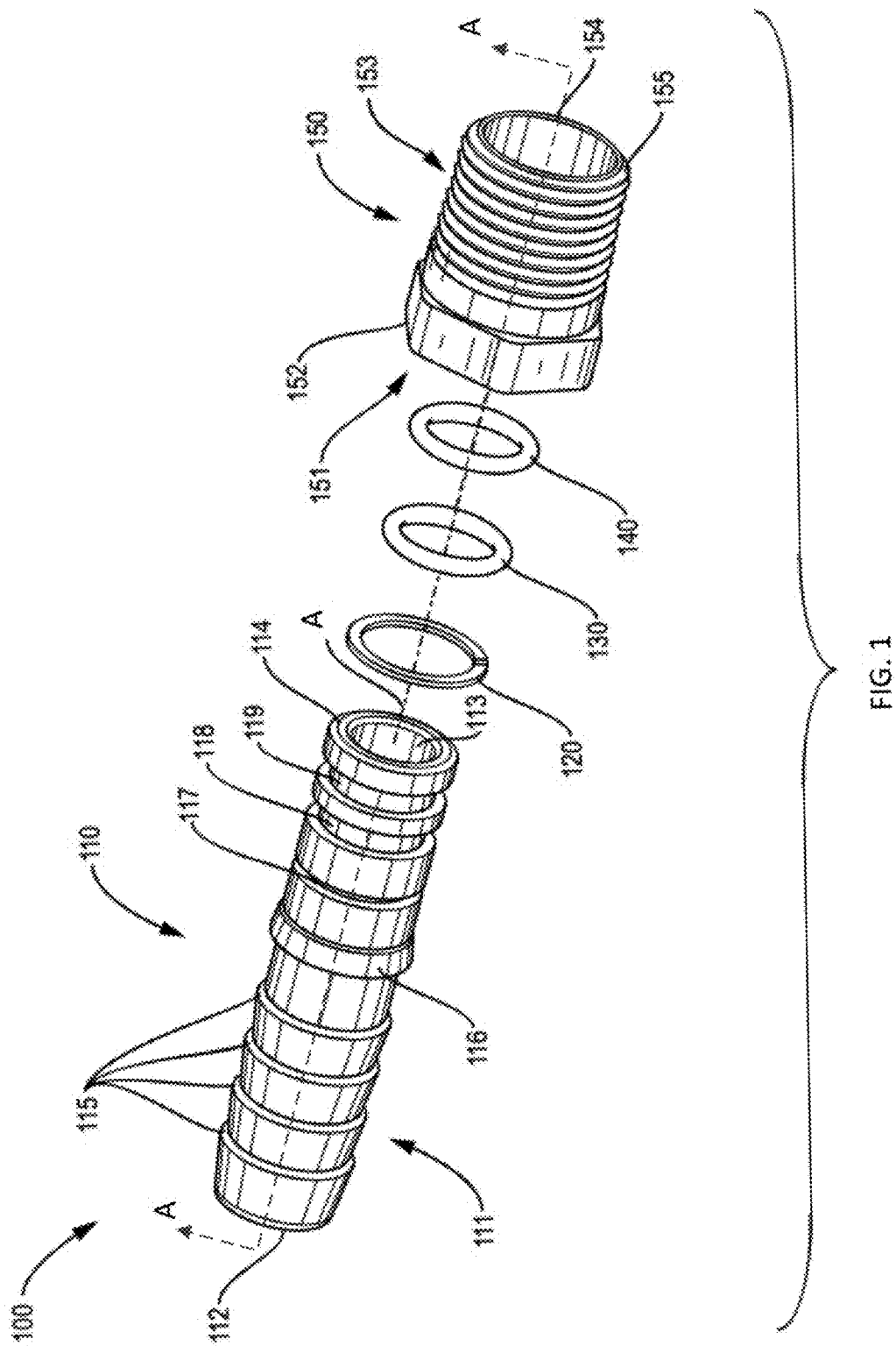
FIG. 1 is an exploded perspective view of the swivel coupling assembly according to this invention.

Referring to FIG. 1, there is shown a swivel coupling assembly 100, according to an aspect of this invention, in an exploded view depicting the two sub-assemblies, namely, annular barb insert assembly 110 and annular fitting sub-assembly 150. When joined the sub-assemblies form a rotatable coupling to interconnect, for example, two fluid carrying hoses (not shown), one affixed to each sub-assembly at ends 112 (barb insert end) and 154 (fitting assembly end), respectively. It should be noted that various size hoses may be accommodated by changing the sizes of the ends 112 (barb insert end) and 154 (fitting assembly end) of the sub-assemblies and the overall diameter of the swivel coupling assembly.

Barb insert assembly 110 is a machined metallic part formed of brass or a comparable material having an outer surface 111 with a varying radius along its length and an inner surface 113 defining a bore through which fluid may flow between the hoses interconnected by the swivel coupling assembly 100. On outer surface 111 of barb insert assembly 110 there is a barb insert 114 spaced from barb insert end 112, along the longitudinal axis A of barb insert assembly 110, and at the opposite end of said assembly.

Beginning at end 112 are formed a series of annular barbs 115 (in this example there are four but there may be greater or fewer depending on the application) which are designed to be inserted into a hose up to approximately shoulder 116 and provide a certain amount of gripping force to hold the hose in place on barb insert assembly 110. The amount of gripping force may not be sufficient to hold the hose in place in the hostile environments encountered by these components, therefore, a metal crimp (not shown) may be installed over the hose in the area of the barb insert assembly to more securely hold the hose in place.

Between shoulder 116 and barb insert 114 are formed three annular grooves 117, 118, and 119 in outer surface 111 of barb insert assembly 110. The groove closest to shoulder 116 may be a retaining ring groove 117 in which retaining ring 120 is disposed. The diameter of the retaining ring 120 is slightly larger than the diameter of the outer surface 111 in the area adjacent to the retaining ring groove 117, which results in the retaining ring protruding above the outer surface 111 when it is disposed in the retaining ring groove 117. Retaining ring 120 may be formed of a metal, such as stainless steel, carbon steel or the like, to provide it with sufficient stiffness to hold the two sub-assemblies in place when they are interconnected, as described below. Retaining ring 120 is constructed in the form of a coil so that as force is applied about the circumference it compresses and its diameter is reduced and when the force is terminated the ring expands to its neutral position with an increased diameter. The width of groove 117 is only slightly larger than the width of retaining ring 120, allowing for insertion of the ring but providing a friction fit so as to retain it in place.

Grooves (or glands) 118 and 119 are also disposed in outer surface 111, but they are further along the longitudinal axis A and closer to barb insert 114 than groove 117. Grooves 118 and 119 may have a width greater than groove 117, so they can accommodate O-ring seals 130 and 140, respectively, which may have a greater width than retaining ring 120. The diameters of O-ring seals 130 and 140 are slightly larger than the diameter of the outer surface 111 in the area adjacent to grooves 118 and 119, which results in the O-ring seals protruding just above the outer surface 111 when they are disposed in the grooves. In this example, groove 119 abuts barb insert 114.

Still referring to FIG. 1, at end 154 of annular fitting assembly 150 are a series of threads 153 on the outer surface for engaging with the inner surface of a hose (not shown), for example. Opposite end 151 has a hexagonal nut 152, which may be engaged by a wrench or other appropriate tool to apply torque to the annular fitting assembly 150 as it is installed on the hose. Inner surface 155 defines a bore through which fluid may flow between the hoses interconnected by the swivel coupling assembly 100.

Figure 2A:
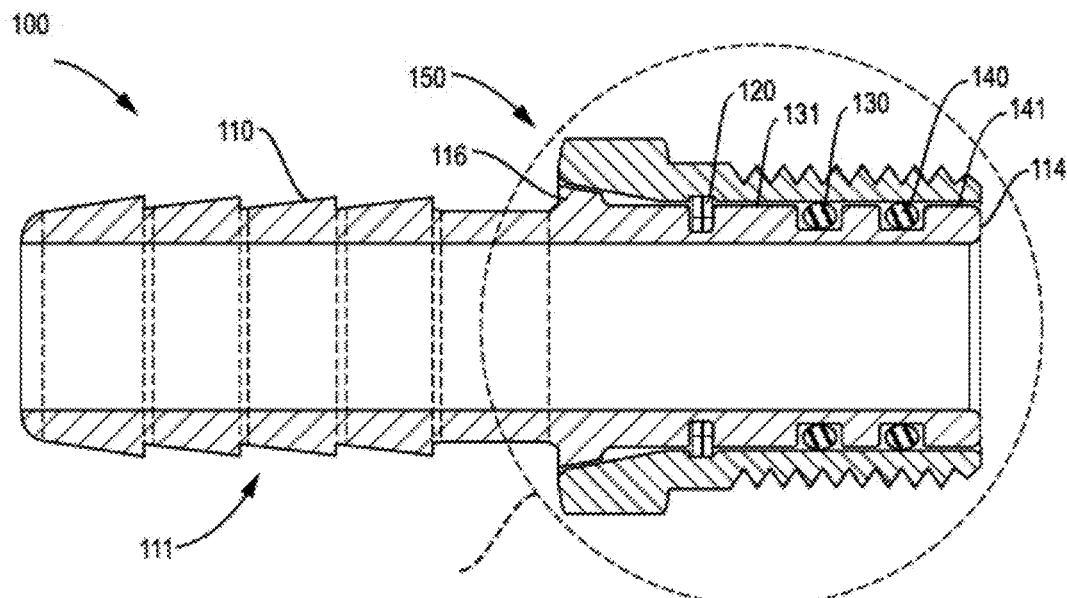
FIGS. 2A and 2B show a cross-sectional view of the swivel coupling assembly of FIG. 2 taken along line A-A.
Figure 2B:
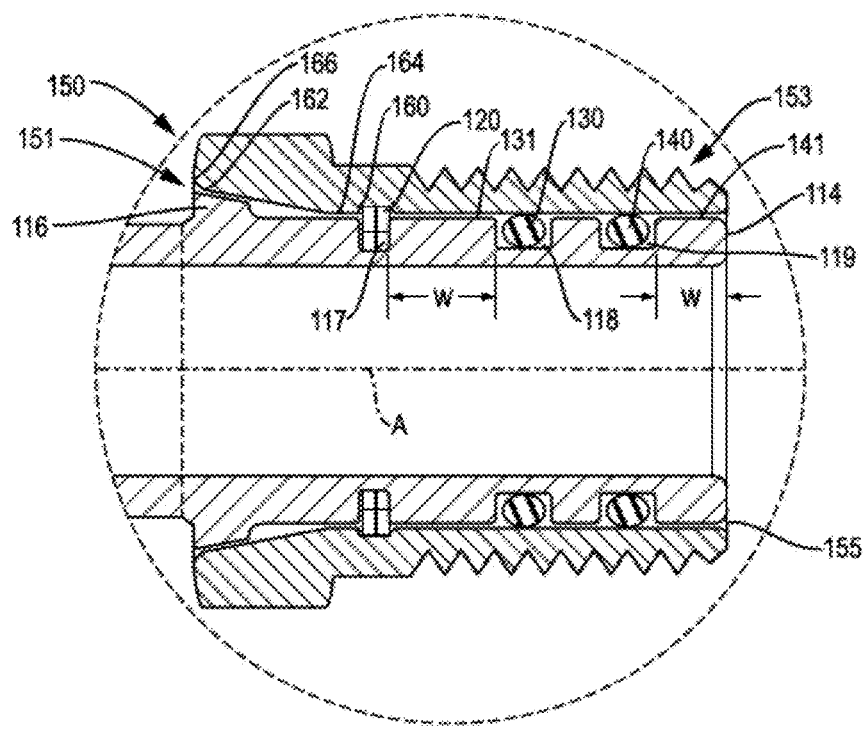

A cross-sectional view of swivel coupling assembly 100 is shown in FIGS. 2A and 2B with annular barb insert assembly 110 and annular fitting sub-assembly 150 joined to form a rotatable coupling. When the sub-assemblies are joined, outer surface 111 of barb insert assembly 110 (within fitting assembly 150) is mated with inner surface 155 annular fitting sub-assembly 150 and barb insert 114 is substantially aligned with end 154. At the opposite end 151 of annular fitting sub-assembly 150, barb insert shoulder 116 is mated with inner surface 155 and forms a frictional connection to allow for rotation of the annular barb insert assembly 110 with respect to the annular fitting sub-assembly 150.

Still referring to FIGS. 2A and 2B, retaining ring 120 is positioned in annular recess 160 formed in inner surface 155 and also in retaining ring groove 117. In this position, the annular barb insert assembly 110 and annular fitting sub-assembly 150 are locked together in place preventing them from being pulled apart. Retaining ring 120 is designed to withstand axial forces sufficiently greater than those likely to be encountered by the components under normal environmental conditions.

O-ring seals 130 and 140 are shown in a compressed state in annular grooves/glands 118 and 119, respectively, since the diameter of the bore in annular fitting sub-assembly 150 defined by inner surface 155 is slightly smaller than the diameters of O-ring seals 130 and 140. This forms tight seals with inner surface 155 to prevent fluids from flowing in the gap defined by outer surface 111 of annular barb insert assembly 110 and inner surface 155 of annular fitting sub-assembly 150. In addition, wide bearing surfaces 131 and 141 are included adjacent to O-rings 130 and 140, respectively, which are in contact with and bear against inner surface 155 of annular fitting sub-assembly 150 to provide stable bearing surfaces to protect the O-rings from abnormal loading. This is particularly important as the components wear over time and may otherwise become susceptible to wobble during rotation. By wide, what is meant is that the bearing surfaces are at least as wide as the width of the annular grooves/glands 118 and 119 and preferably wider. The typical range for each bearing surface may be from 1 to 3.5 times wider than the annular grooves. In this embodiment, it should be noted that bearing surface 131 is the external surface of barb insert 114.

By way of example, bearing surface 131 may be 0.186 in. in width and bearing surface 141 may be 0.113 in. in width. With annular grooves 118/119 having a width of 0.095 in. the bearing surfaces 131 and 141 are respectively 1.19 and 1.86 times the width of the annular grooves. These dimensions are provided only as an example and should not be considered as limiting the scope of the invention.

The O-ring seals 130 and 140 as well as the retaining ring 120 and the outer surface 111 in the region of the annular barb insert assembly 110 inside the bore of annular fitting sub-assembly may be coated with a lubricant to provide for a smoother and easier insertion and rotational movement when the coupling is installed. To further facilitate a smoother and easier insertion, proximate end 151 of annular fitting assembly 150, the opening to the bore defined by inner surface 155 at location 162 is shown to have a wider diameter than the nominal diameter of the bore, such as at location 164 and throughout the rest of the bore to end 154 (excluding annular recess 160). The portion of the bore having a nominal diameter is cylindrical in shape. From location 164 to 162 the diameter of inner surface 155 gradually increases at fixed angle relative to longitudinal axis A (approximately 5 to 10 degrees) about the circumference of the bore, thus forming a frusto-conically shaped section between locations 162 and 164. From location 162 to the end 151 is formed a chamfered outer edge 166 which further helps in the smooth insertion of the annular barb insert assembly 110 into the annular fitting assembly. In particular, chamfered edge 166 is helpful in transitioning the retaining ring 120 as it goes from its normal expanded position and it begins to be compressed when it enters the bore.

During the assembly process, as retaining ring 120 encounters chamfered edge 166 it is guided into place and once it enters the bore at location 162 the force and compression on retaining ring 120 begins and gradually increases until the ring reaches location 164. As the retaining ring is pressed further into the bore beyond location 164, it encounters annular recess 160, at which point the force on the circumference of the retaining ring 120 is removed and retaining ring 120 expands and locks in place in annular recess 160. Once locked in place in annular recess 160, the retaining ring 120 prevents further movement of annular barb insert assembly 110 in either direction in the bore. Once in the installed position it can be seen that the outer surface of shoulder 116 is angled in a complimentary fashion to the inner surface 155 of the annular fitting assembly in that region to allow for a proper frictional fit and enable rotation between the two sub-assemblies.

One application of the swivel coupling described herein is hose end repair when provided as part of a kit which may be used to make field repairs to damaged hoses. An embodiment of the swivel coupling according to this invention for this application is depicted in FIGS. 4-7, as part of a hose end repair kit 200. The swivel coupling for this application disclosed herein is a variation on the live swivel coupling of FIGS. 1-2, but it should be understood that it includes the design attributes and variations of the live swivel of FIGS. 1-2 as described above.

Figure 3A:
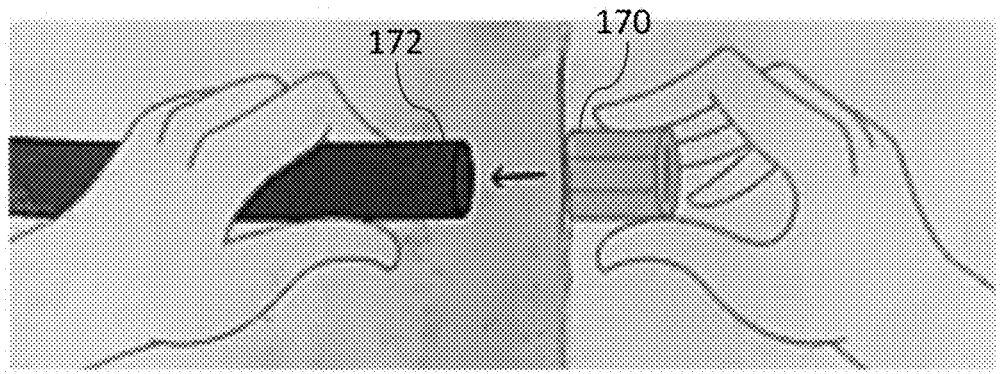
FIG. 3A-3C are perspective views of the step by step installation of a prior art hose end repair kit with a swivel coupling assembly.
Figure 3B:
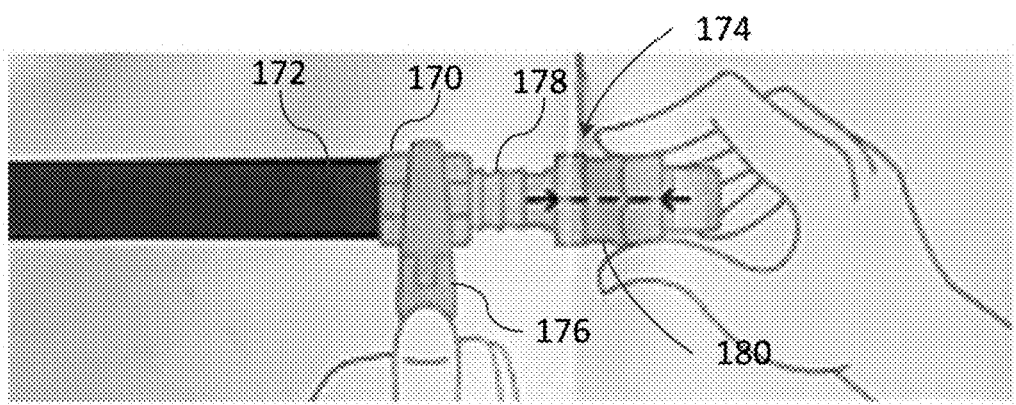
Figure 3C:
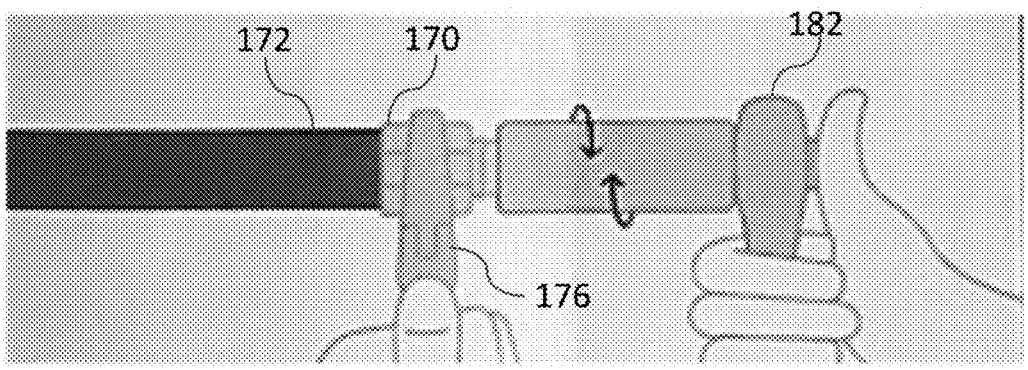

Hose end repair kits utilizing a live swivel coupling, according to an aspect of this invention, provides marked advantages over prior art hose end repair kits. On such prior art kit is depicted in FIGS. 3A-3C. In FIG. 3A, the step of installing a hose retaining sleeve 170 on an end of hose 172 is shown. In FIG. 3B, the prior art live swivel assembly 174 is shown being inserted into the end of hose 170 through the hose retaining sleeve 170 while wrench 176 is used to hold the hose retaining sleeve in place. Live swivel is comprised of two components the hose insert member 178 and the hose fitting 180. The hose insert member 178, which includes barbs and a threaded tip, is inserted into the hose 172 to secure the live swivel therein. The hose fitting 180 is coupled the hose insert 178 by crimping the two components together. The crimping allows the two components to stay connected but due to the internal design of the components and the right amount of pressure applied during the crimping process, they are able to rotate relative to each other. In FIG. 3C, a socket is placed over the live swivel and torque is applied thereto to cause the threads of the tip of the hose insert member 178 to engage with the inner surface of hose 172 to retain it thereto. This is done while the wrench 176 holds the hose retaining sleeve 170 in place. With this type of prior art kit, since it requires crimping of the components of the live swivel together to interconnect the components, materials such as steel rather than the more malleable brass must be used to prevent over-torqueing and leakage. This leads to corrosion issues and fitting seize-up.

Figure 5:
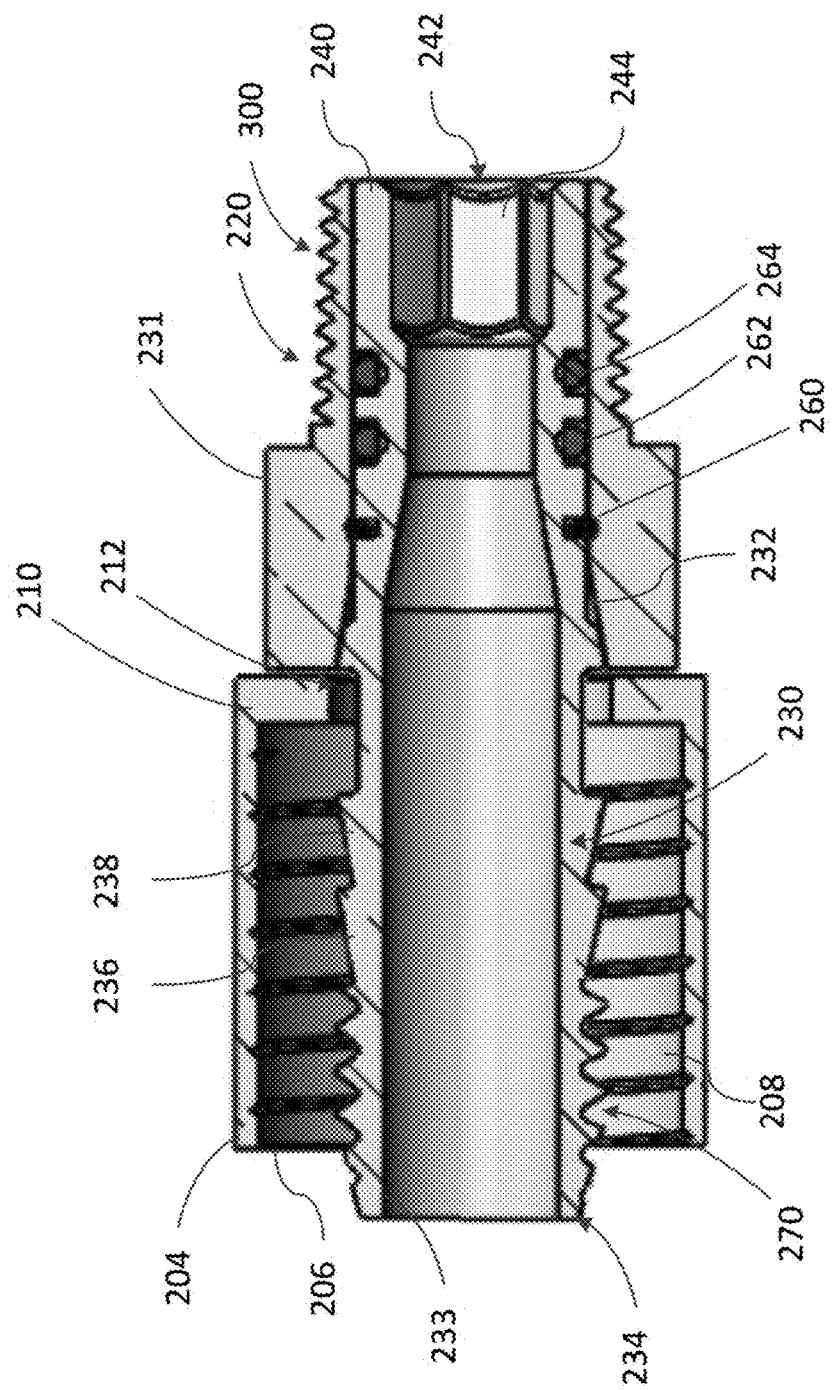
FIG. 5 is a cross sectional view of the hose end repair kit of FIG. 4B taken along line B-B.

Referring again to FIGS. 4-7, hose end repair kit 200 includes a hose retaining sleeve 202 having a first end 204 with a first opening 206 in communication with an interior portion 208 of the hose retaining sleeve. First opening 206 is configured to receive an end of a first hose (not shown) into the interior portion 208 of the hose retaining sleeve 202 when the hose retaining sleeve is mounted thereon. The hose retaining sleeve 200 further includes a second end 210, opposite first end 204, which has a second opening 212. As can be seen in FIG. 5 the inner wall of the retaining sleeve 202 includes threads for securing it to the hose when screwed thereon. However, the amount of gripping force may not be sufficient to hold the first hose in place in the hostile environments encountered by these components, therefore, the retaining sleeve 202 may be crimped to more securely hold the hose in place.

In addition to the hose retaining sleeve 202, kit 200 includes a live swivel coupling 220, which, when mated with retaining sleeve 202, as shown in FIG. 4B, is partially inserted into the second opening 212 of hose retaining sleeve 202. Referring to FIGS. 4A and 5, swivel coupling 220 includes a hose insert 230 (also referred to herein as a first annular member) and a hose fitting 231 (also referred to herein as a second annular member, which is described in more detail in FIG. 8 below). The first annular member 230 has an outer surface 232 and an inner surface 233 and there is a first end portion 234 having annular barbs 236 and 238 on the outer surface 232 of first annular member 230. Annular barbs 236 and 238 are configured to be inserted into the interior of the first hose and engage with the interior surface of the hose to help retain the swivel coupling 220 in place on the first hose. It should be noted that any number of barbs (one or more) may be used depending on the requirements of the particular design of the swivel coupling or its application.

At a second end portion 240 of the first annular member 230 there may be formed an opening 242 allowing access to inner surface 234 of the first annular member 230, wherein there may be formed a socket 244, such as a hex socket, to receive a key 246, such as a hex key. The key 246 when inserted into the socket and turned causes the swivel coupling to engage with the inside of the first hose, as described below.

Figure 6:
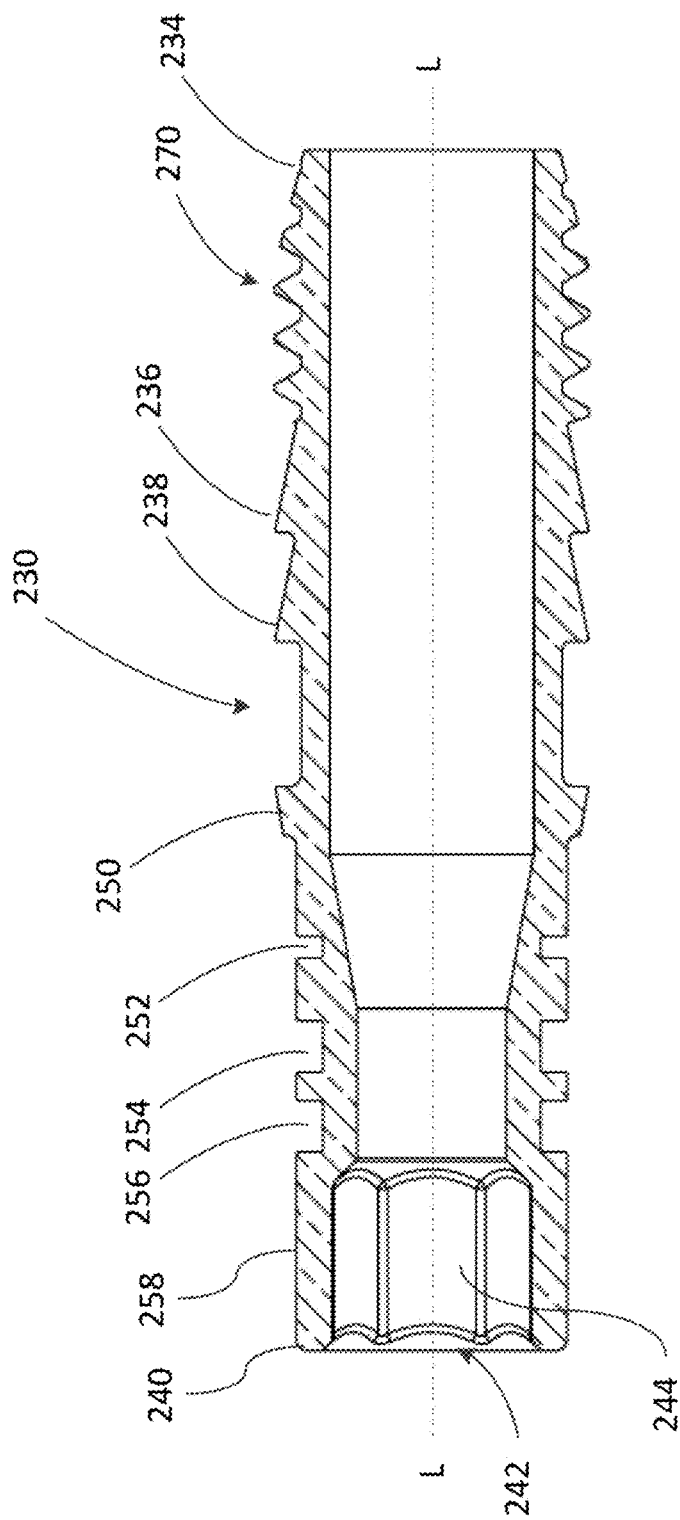
FIG. 6 is a cross sectional view of the hose insert of the live swivel coupling of hose end repair kit of FIG. 4B.

Referring to FIG. 6, first annular member 230 is shown in more detail. Between first end 234 and second end 240 of first annular member 230 is shoulder 250, which engages with the inner surface of the second annular member 231 of coupling assembly 220, as described further below. Between shoulder 250 and second end 240 of first annular member 230 are formed three annular grooves 252, 254, and 256 in outer surface 232 of first annular member 230. The groove closest to shoulder 250 may be a retaining ring groove 252 in which retaining ring 260 (see FIG. 4A and FIG. 5) may be disposed. The diameter of the retaining ring 260 is slightly larger than the diameter of the outer surface 232 in the area adjacent to the retaining ring groove 250, which results in the retaining ring protruding above the outer surface 232 when it is disposed in the retaining ring groove 252. As described above, retaining ring 260 may be formed of a metal, such as stainless steel, carbon steel or the like, to provide it with sufficient stiffness to hold the two sub-assemblies in place when they are interconnected, as described below. The width of groove 252 is only slightly larger than the width of retaining ring 260, allowing for insertion of the ring but providing a friction fit so as to retain it in place.

Still referring to FIG. 6, grooves (or glands) 254 and 256 are also disposed in outer surface 232, but they are further along the longitudinal axis L and closer to second end 240 than groove 252. Grooves 254 and 256 may have a width greater than groove 252, so they can accommodate O-ring seals 262 and 264, respectively, (see FIG. 4A and FIG. 5) which may have a greater width than retaining ring 260. The diameters of O-ring seals 262 and 264 are slightly larger than the diameter of the outer surface 232 in the area adjacent to grooves 254 and 256, which results in the O-ring seals protruding just above the outer surface 232 when they are disposed in the grooves. In this example, groove 256 abuts exterior 258 of socket 244. At first end 234 of first annular member 230 are a series of threads 270 on the outer surface 232 for engaging with the inner surface of the first hose (not shown), for example.

Figure 7:
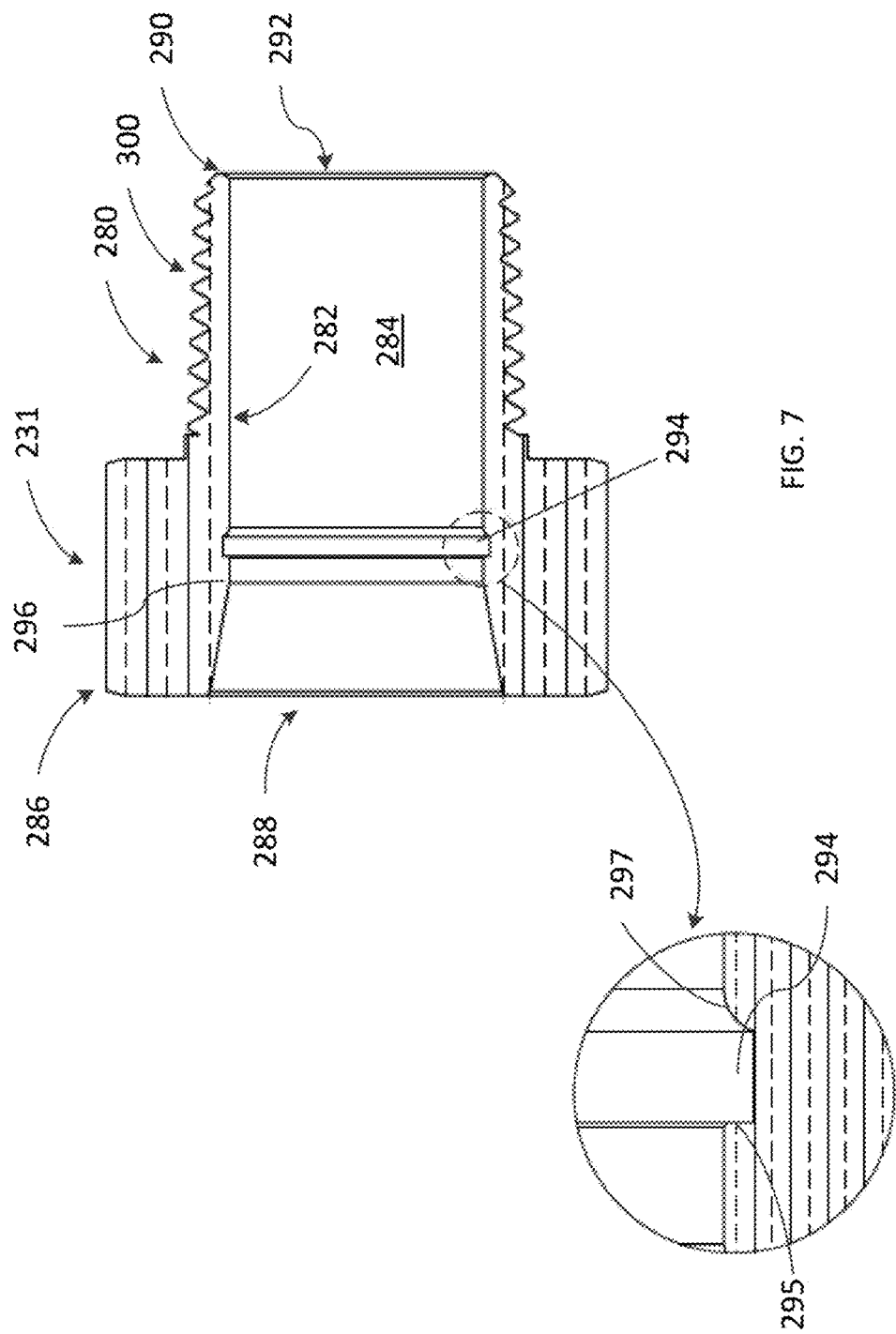
FIG. 7 is a cross sectional view of the hose fitting of the live swivel coupling of hose end repair kit of FIG. 4B.

The second annular member 231 is shown in more detail in FIG. 7 to have an outer surface 280 and an inner surface 282. The inner surface 282 defines a bore 284 which is configured to receive the first annular member 230, as depicted in FIG. 5. The second annular member 231 includes a first end portion 286 having a first opening 288 in communication with bore 284. The second annular member 231 also includes a second end portion 290 spaced from first end portion 288 and having a second opening 292 in communication with bore 284. From a location proximate the first opening 288 in the first end portion 286 to a location 296 on the inner surface 282, the inner surface of the bore 284 is frusto-conically shaped, after which point the inner surface 282 of the bore 284 is cylindrical in shape. The frusto-conically shaped inner surface may be angled at least five degrees with respect to a longitudinal axis of the second annular member 231.

Proximate the transition point from the frusto-conically shaped portion of bore 284 to the cylindrical portion of bore 284 there is an annular recess 294 formed in the inner surface 282. The annular recess 294 is configured to receive the retaining ring 260 when the first annular member 230 is inserted into the second annular member 231 and the annular recess 294 is aligned with the annular retaining ring groove 252. In the enlarged portion of FIG. 7, it can be seen that one wall 295 of recess 294 is perpendicular to the inner surface 282 while the second wall 297 is curved with a convex shape. The second, curved wall 297 is provided for the purpose of allowing the retaining ring to rotate more freely in annular recess 294.

As the first annular member 230 is inserted into the second annular member 231 the retaining ring 260 is gradually compressed as it travels along the frusto-conically shaped portion inner surface 282 of the bore 284 until it reaches the annular recess 294 and expands into and is seated in the annular recess 294. In this position, as best seen in FIG. 5, the retaining ring 260 locks the first annular member 230 and the second annular member 231 together. It should be noted that this may be done by the manufacturer and provided in the kit as an assembled swivel coupling 220 which would then be inserted into the hose sleeve 202 as shown in FIGS. 4A and 4B. This is significant improvement over the prior art kit described with regard to FIGS. 3A-3C, which requires that the two comparable components be assembled and then secured together by crimping, which is more burdensome for the installer and less precise in terms of the quality and strength of the connection.

Referring again to FIG. 5, angled shoulder 250 of the first annular member 230 conforms with and frictionally engages the frusto-conically shaped inner surface of the bore 284 of the second annular member 231 proximate the opening 288, thereby allowing the first annular member 230 to rotate relative to the second annular member 231. O-ring seals 262 and 264 are shown in a compressed state in annular grooves/glands 254 and 256, respectively. This forms tight seals with inner surface 282 to prevent fluids from flowing in the gap defined by outer surface 232 of first annular member 230 and inner surface 282 of second annular member 231.

At end 290 of second annular member 231 are a series of threads 300 on the outer surface 280 for engaging with the inner surface of a second hose (not shown), for example, or a complimentarily threaded fixture. At end 286 there is hexagonal nut, which may be engaged by a wrench or other appropriate tool to apply torque to swivel coupling 220 as it is installed on the first hose. However, as described above, this is not necessary as the wrench 246 when inserted into socket 244 and when used to apply torque to the swivel coupling 220, this will be sufficient secure the swivel coupling and the hose sleeve 202 onto the end of the first hose.

While the foregoing description of the invention enables one of ordinary skill to make and use what is considered presently to be the best mode thereof, those of ordinary skill will understand and appreciate the existence of variations, combinations, and equivalents of the specific embodiments and examples herein.

The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above-described embodiments and examples, or embodiments and applications within the scope and spirit of the invention claimed as follows.

The invention claimed is:

1. A hose end repair kit, comprising:
a hose retaining sleeve having a first end with a first opening in communication with an interior portion of the hose retaining sleeve, the first opening configured to receive an end of a first hose into the interior of the hose retaining sleeve when the hose retaining sleeve is mounted on the first hose; the hose retaining sleeve further having a second end, opposite the first end, the second end having a second opening;
a swivel coupling partially inserted into the second opening of the hose retaining sleeve; the swivel coupling configured to engage with an interior of the first hose when the hose retaining sleeve is mounted on the first hose; wherein the swivel coupling, comprises:
a first annular member having an outer surface and an inner surface, the first annular member including:
a first end portion having at least one annular barb on the outer surface and configured to be inserted into the interior of the first hose;
a second end portion spaced from the first end portion, the second end portion having an opening allowing access to the inner surface of the first annular member wherein there is formed a socket to receive a key;
an angled shoulder positioned between the at least one annular barb and the second end portion;
at least one annular groove disposed in the outer surface of the first annular member and positioned between the shoulder and the second end portion, the at least one annular groove containing a seal; and
an annular retaining ring groove disposed in the surface of the first annular member and positioned between the at least one annular groove and the shoulder, the annular retaining ring groove containing a retaining ring which protrudes above the surface of the first annular member; and
a second annular member having an outer surface and an inner surface, the inner surface defining a bore configured to receive the first annular member, the second annular member including:
a first end portion having a first opening in communication with the bore; and
a second end portion spaced from the first end portion and having a second opening in communication with the bore;
an annular recess in the inner surface of the bore, wherein the annular recess is configured to receive the retaining ring when the first annular member is inserted into the second annular member, and wherein the annular recess is aligned with the annular retaining ring groove;

wherein from a location proximate the first opening in the first end portion of the second annular member to a cylindrical portion of the bore, the inner surface of the bore is frusto-conically shaped;

wherein, when the first annular member is inserted into the bore of the second annular member:

the retaining ring is gradually compressed as the retaining ring travels along the frusto-conically shaped inner surface of the bore until it reaches the annular recess and expands into and is seated in the annular recess; and the angled shoulder of the first annular member conforms with and frictionally engages the frusto-conically shaped inner surface of the bore of the second annular member proximate the first opening, thereby allowing the first annular member to rotate relative to the second annular member.

2. The hose end repair kit of claim 1 wherein the at least one annular groove of the swivel coupling includes a plurality of annular grooves and further included are a like plurality of seals, one disposed in each of the plurality of annular grooves.

3. The hose end repair kit of claim 1 further including a first bearing surface on a first side of the at least one annular groove in the direction of the shoulder and a second bearing surface on a second side of the at least one annular groove in the direction of the second end portion of the first annular member; wherein the first bearing surface and the second bearing surface have widths between one (1) and three and one half (3.5) times the width of the at least one annular groove.

4. The hose end repair kit of claim 1 wherein the frusto-conically shaped inner surface is angled at least five degrees with respect to a longitudinal axis of the second annular member.

5. The hose end repair kit of claim 1 wherein the first end portion of the first annular member includes a plurality of annular barbs which are configured to engage with the interior of the first hose.

6. The hose end repair kit of claim 1 wherein the inner surface of the first annular member defines a bore configured to carry a fluid there-through.

7. The hose end repair kit of claim 1 wherein the outer surface of the second annular member proximate the second end portion includes a threaded portion configured to be engaged with a second hose or a complimentarily threaded fixture.

8. The hose end repair kit of claim 1 wherein the outer surface of the first annular member proximate the first end portion includes a threaded portion and wherein the first annular member is configured to be rotated when the key is inserted into the socket and a torque is applied thereto thereby causing the threaded portion of the first annular member to engage with the interior of the first hose.

* * * * *